INVENTORS.
MEREDITH R. HATCH
ROBERT H. KEMP
BY
ATTORNEYS

March 4, 1958  M. R. HATCH ET AL  2,825,092
BRIQUETTING PRESS
Filed Nov. 17, 1954  11 Sheets-Sheet 4

INVENTORS.
MEREDITH R. HATCH
ROBERT H. KEMP
BY
Williams & Tilberry
ATTORNEYS

March 4, 1958 — M. R. HATCH ET AL — 2,825,092
BRIQUETTING PRESS
Filed Nov. 17, 1954 — 11 Sheets-Sheet 5

Fig. 8
Fig. 9
Fig. 10

INVENTORS.
MEREDITH R. HATCH
ROBERT H. KEMP
BY
Williams & Tilberry
ATTORNEYS

March 4, 1958 M. R. HATCH ET AL 2,825,092
BRIQUETTING PRESS
Filed Nov. 17, 1954 11 Sheets-Sheet 6

INVENTORS.
MEREDITH R. HATCH
ROBERT H. KEMP
BY
Williams & Tilberry
ATTORNEYS

Fig. 14

INVENTORS.
MEREDITH R. HATCH
ROBERT H. KEMP
BY
Williams & Tilberry
ATTORNEYS

March 4, 1958  M. R. HATCH ET AL  2,825,092
BRIQUETTING PRESS
Filed Nov. 17, 1954  11 Sheets-Sheet 8

INVENTORS.
MEREDITH R. HATCH
ROBERT H. KEMP
BY
Williams & Tilbury
ATTORNEYS

Fig. 18

INVENTORS.
MEREDITH R. HATCH
ROBERT H. KEMP
BY
Williams & Tilberry
ATTORNEYS

March 4, 1958 — M. R. HATCH ET AL — 2,825,092
BRIQUETTING PRESS

Filed Nov. 17, 1954 — 11 Sheets-Sheet 10

INVENTORS.
MEREDITH R. HATCH
ROBERT H. KEMP
BY
Williams & Tilberry
ATTORNEYS

Fig. 21

__United States Patent Office__  2,825,092
Patented Mar. 4, 1958

2,825,092
BRIQUETTING PRESS

Meredith R. Hatch and Robert H. Kemp, Toledo, Ohio, assignors to E. W. Bliss Company, Canton, Ohio, a corporation of Delaware Application November 17, 1954, Serial No. 469,485

12 Claims. (Cl. 18—16.7)

This invention relates to improvements in power presses and more particularly to improvements in presses adapted to shape and press a powdered or granular material into predetermined blank form, and particularly into bushings or the like.

It is an object of the invention to provide improved means for pressing a loose metallic powder or other powdered or granular material into bushings or the like, whereby the pressing is accomplished by relative movements of dies against opposite ends of a bushing or cylindrical blank in a mold and wherein the pressed blank is then ejected endwise from the mold by one of the dies without injury to the blank. It is another object of the invention to provide a compressing or briquetting press having improved means requiring less power for stripping the pressed article from the mold in the press table. Still another object of the invention is the provision of a press having a mechanically operated downwardly directed pressing die above a second upwardly directed pressing die, a differentially movable core therein, and fluid pressure means associated with said second pressing die and core automatically controlled and operable to cushion the action thereof and to impart predetermined movements thereto relative to each other and to the first die during a blank pressing cycle. A further object of the invention is the provision, in combination with the opposed dies and core means and controlling means therefor, of an external shaping mold or die operating in conjunction therewith and independently movable relative thereto, and means for imparting predetermined movements to the mold relative to the pressing dies and core during a cycle of operations of the press.

To the attainment of these ends and the accomplishment of other new and useful objects as will appear hereinafter, the invention consists in the features of novelty more fully described and claimed hereinafter, and shown in the accompanying drawings illustrating a preferred embodiment of the invention in which.

In general, the press comprises a base which supports opposed side members, a crown secured to the top of said side members, a slide and upper pressing or compacting die carried in the upper part of the press for vertical sliding movement between said side members, and a table beneath said slide also adapted for vertical sliding movement between said side members. The table houses a mold member or die, a core centrally disposed within said mold and a lower pressing or compacting die adapted to slide upwardly through the bottom of said mold whereby a charge of powder placed in said mold is pressed between said upper and lower dies to form a unitary, coherent article of a form determined by the dies. The slide is mechanically driven such as by a crank journaled in the crown to impart simple harmonic motion thereto. The table and core are each connected to separate yielding means adapted to permit them to be moved downwardly by the pressure of the slide, and in this sense it may be said that the table and core also are mechanically driven during the first half of the operating cycle. During the downward movement of the slide, the lower die is firmly and rigidly supported relative to the base of the press and does not move. As the upper die enters the mold, the powder therein is given an initial pressing until contact is made between the die and the table, whereupon the table and upper die continue downwardly as a unit further compacting the powder against the then stationary lower die. This completes the pressing operations and the first half of the operating cycle, about half of the compressing being downwardly from the top of the mass of powder and half upwardly from the bottom.

In the last half of the operating cycle, the upper die as drawn upwardly by the mechanical means in the crown and with it the lower die which has become hydraulically locked to the movement of the upper die. Sequential upward movement of the table and lower die respectively strips the work from between the table and the core, and ejects it from the mold. The table continues to move by pneumatic means to its uppermost position and the core is moved upwardly by hydraulic means to its initial position flush with the top surface of the table. Just a few degrees before the completion of the cycle and after the work has been ejected, the hydraulic interlock between the upper and lower dies is released, whereupon the lower die drops back to its initial position at the bottom of the mold. Thus, at the completion of the 360° cycle, all parts have been returned to their starting positions and the press is then ready for another cycle of operation.

Figure 1:
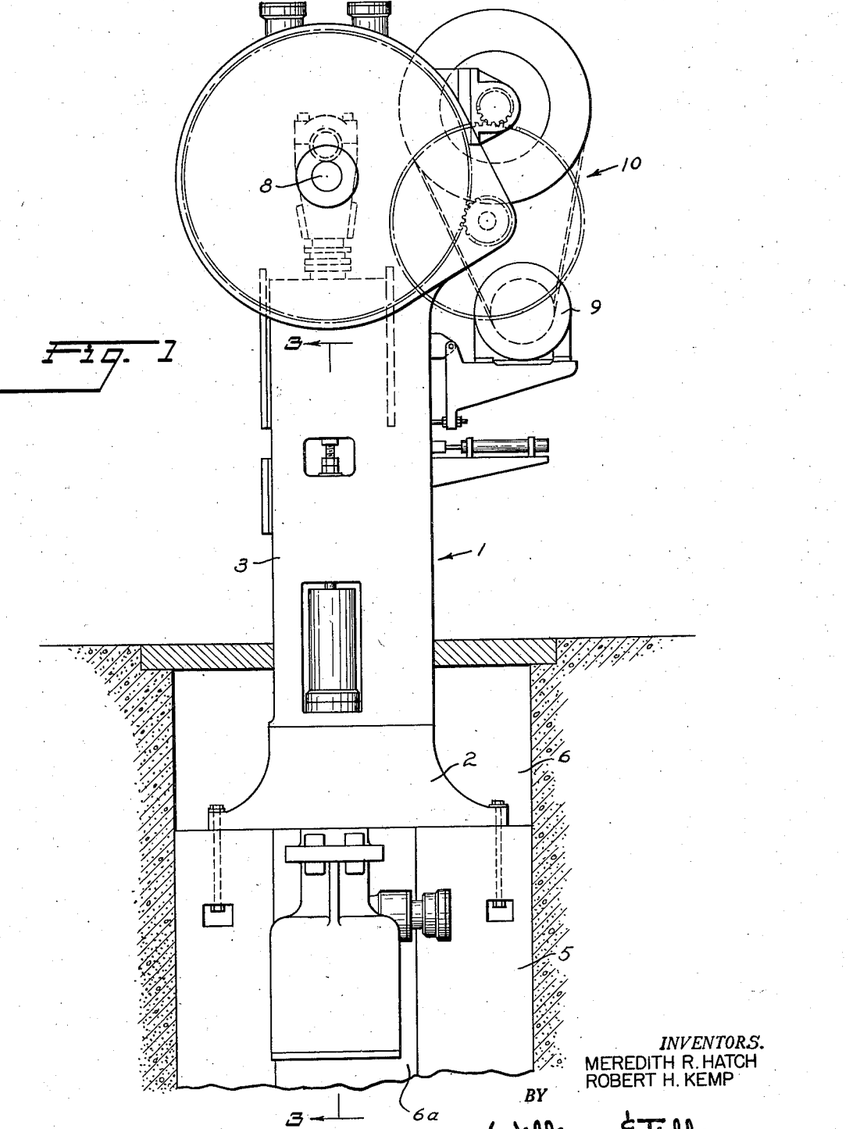
Figure 1 is an illustrative side elevation of a press embodying the invention.
Figure 2:
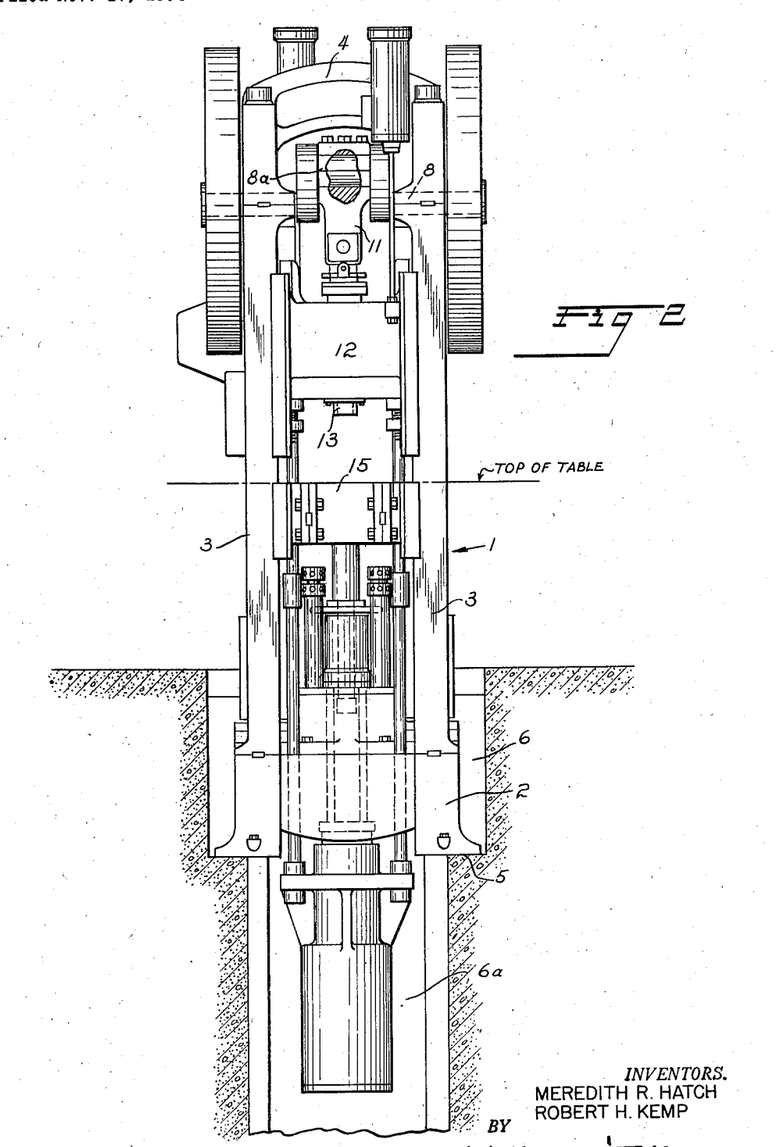
Figure 2 is an illustrative front elevation thereof, with the parts in the at-rest position which they assume at the end of a cycle.

Referring now to the drawings and in particular to Figures 1 and 2, numeral 1 designates generally the press frame which comprises a base 2, opposed side members 3 rising therefrom, and a crown or crosshead 4 mounted on and connecting the tops of the side members. The frame base 2 seats, in the present instance, on a foundation 5 within a pit 6, and such pit has a reduced bottom extension 6a for receiving some of the working parts.

Mounted in the crown portion of the press is the customary crankshaft 8 that is driven, in the present instance, from a motor 9 (Figure 1) at reduced speed through suitable intermediate gearing 10. A center crank 8a (Figure 2) on the shaft 8 has connection through a rod 11 with the top of the die carrying slide 12 which is guided for vertical sliding movement between the upper portions of the frame sides 3. An upper die 13, having in the present instance an annular work pressing portion, is attached to the underside of the slide 12 and extends downwardly therefrom.

*Molding die table and its operation*

Mounted in the frame 1 between its sides 3 and beneath the slide 12 (Figure 3) is a table 15 carrying an external molding die 16 in position to receive the upper pressing die 13. The die 16 seats in a bushing 17 and has a vertical matrix opening or mold cavity 18 entirely therethrough so that it is open at both top and bottom. This opening, in the present instance, is cylindrical and conforms to the outer diameter of a bushing or other workpiece B (Figure 8) to be formed therein from the powder charge A (Figure 3).

The table 15 is guided for limited vertical movement by the frame sides 3 below the slide 12, and has a rod 19 fixed to and projecting downwardly from each end portion thereof. Each rod carries at its lower end vertically spaced pistons 20 and 21 operating, respectively, in vertically aligned cylinders 22 and 23 fixed to the respective frame sides 3 above the base 2. Each cylinder has a relief port 24 (Figure 18) in its upper portion and a fluid pressure inlet port 25 at its bottom. The ports 25 have controlled connection with an operating fluid pressure source through piping 26, suitable valve means 26a, and means (not shown) for operating such valve means in properly timed relation to the movement of the slide 12 being provided. The rods 19 extend through the table 15 to form bumpers 19a at their upper ends for engagement with cushions 19b in registering portions 19c of the frame sides to limit the up strokes of the table. At a predetermined point in each press cycle, pressure in cylinders 22 and 23 is released by the above referred to valve means 26a, permitting the table 15 to lower under downward pressure from the die slide 12 which is applied during the final portion of the down stroke of said slide. During a subsequent portion of the cycle, as hereinafter described, fluid pressure is admitted to such cylinders through the ports 25 and acts on the pistons 20 and 21 to raise the table 15 to the top of its stroke. As will appear later, this movement takes place during the initial portion of the up stroke of the slide 12.

*Lower pressing die and operating means*

Figures 3, 4, 5:
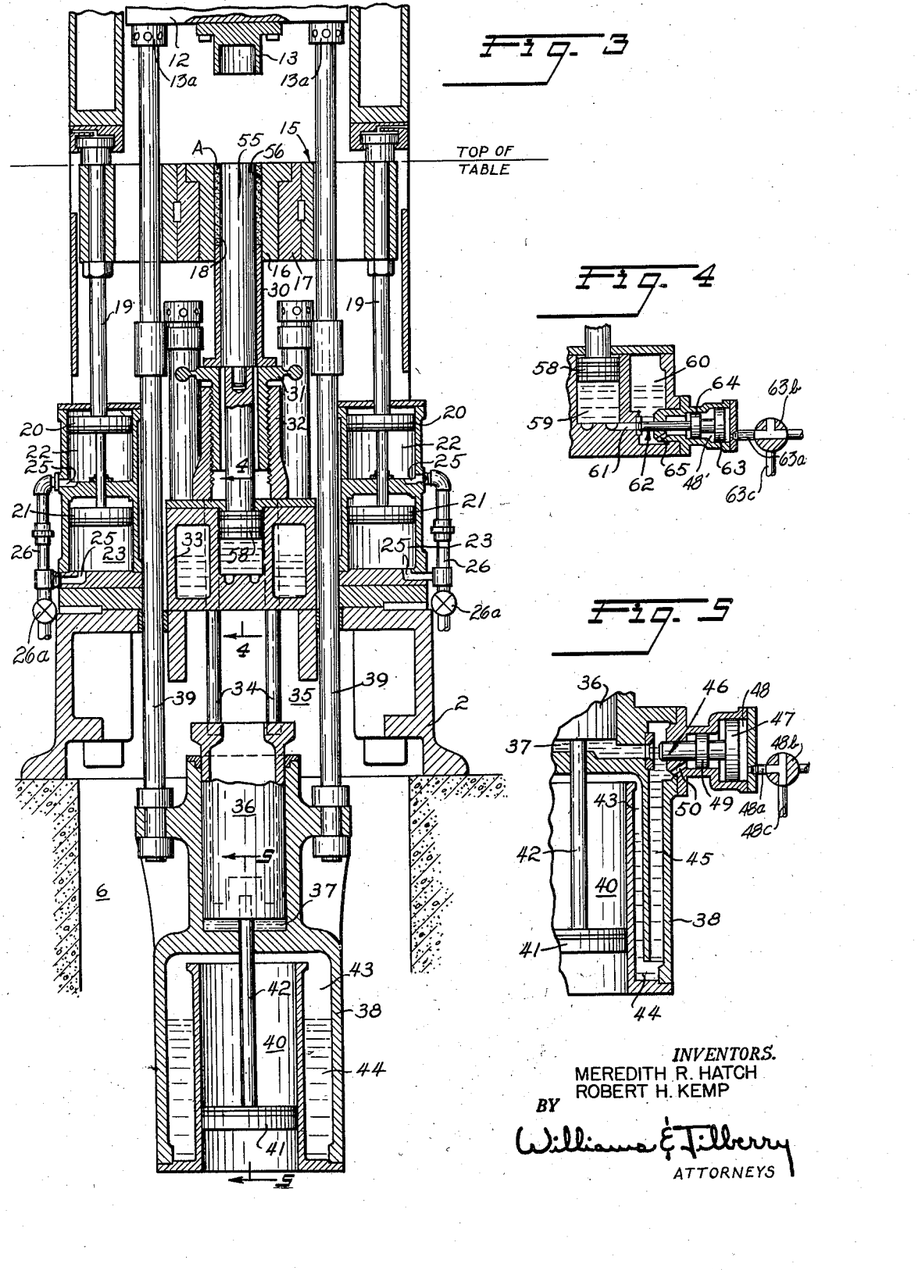
Figure 3 is a fragmentary sectional view of the press taken on the line 3—3 of Figure 1, the parts being in their at-rest positions.
Figure 4 is a fragmentary sectional view taken on the line 4—4 of Figure 3.
Figure 5 is a fragmentary sectional view taken on the line 5—5 of Figure 3.
Figures 8, 9, 10:
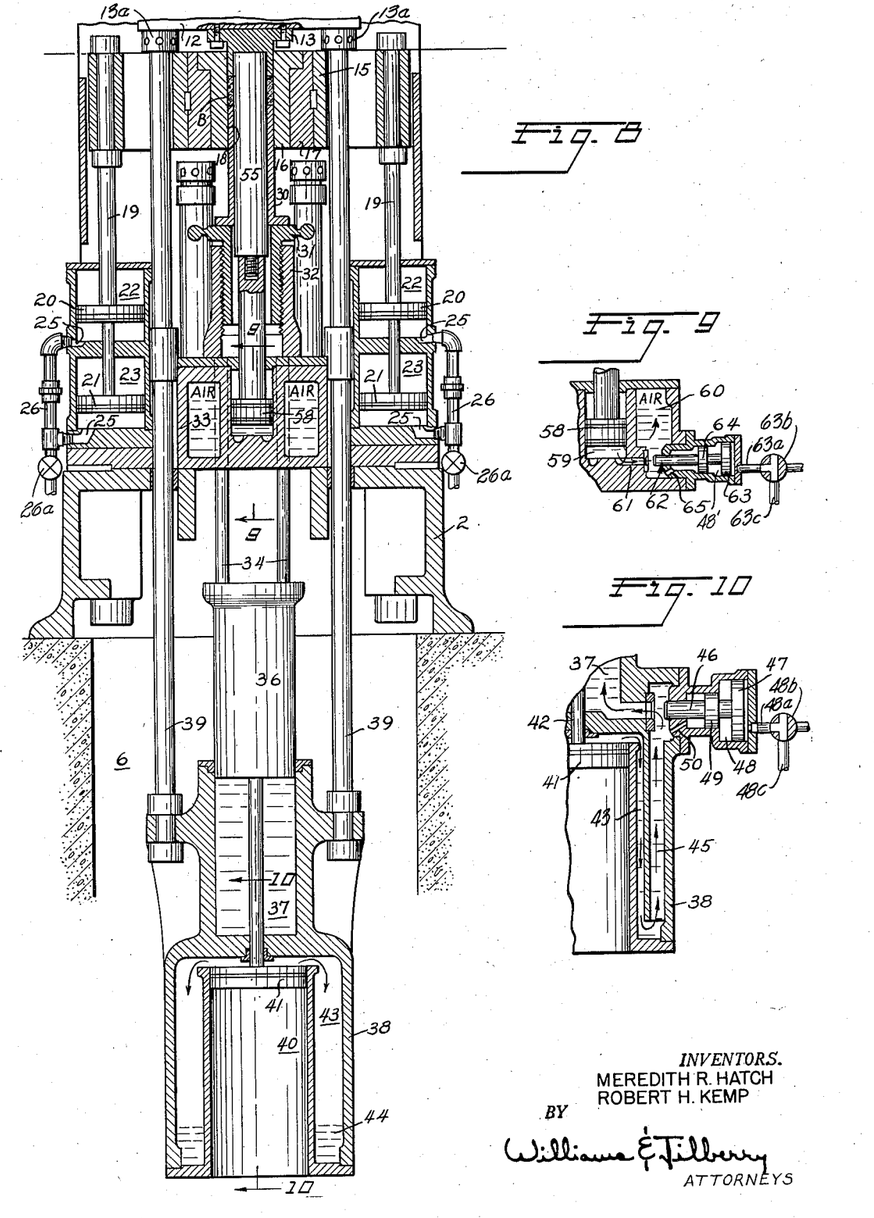
Figure 8 is a view similar to Figure 6 but with the parts in the positions they assume at the limit of the down stroke of the main or mechanically operated slide or plunger.
Figure 9 is a fragmentary sectional view taken on the line 9—9 of Figure 8.
Figure 10 is a fragmentary sectional view taken on the line 10—10 of Figure 8.
Figure 14:
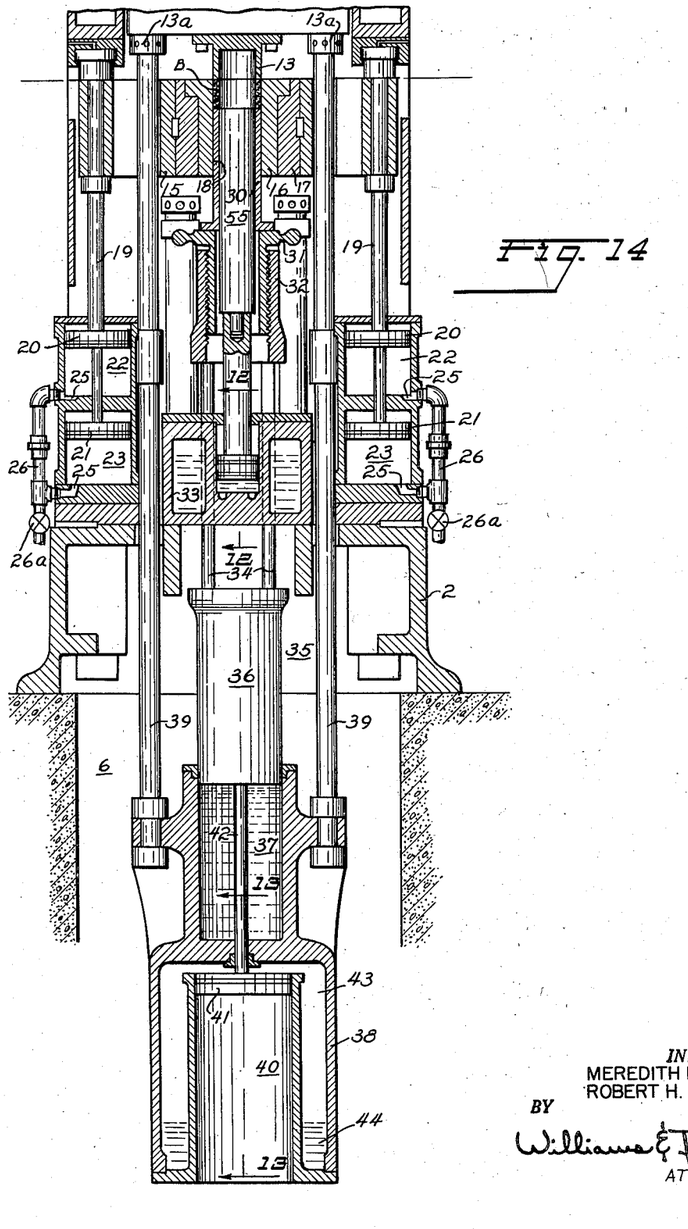
Figure 14 is a view generally similar to Figure 11 but with the main slide and the upper and lower pressing dies moved upwardly relative to the mold table to near work ejecting position.

A lower tubular pressing die 30, corresponding in cross-sectional shape to the upper die 13, has its stroke upwardly through the molding die 16, and in each cycle is intended to have a multiple stage upward movement relative to the table 15, (1) from the starting position shown in Figure 3 to the compressing position shown in Figure 8; (2) from the said compressing position to the initial ejecting position shown in Figure 14; and (3) from the said initial ejecting position to the complete ejecting position shown in Figure 15. The successive positions are shown diagrammatically in Figure 19 at a, d, e and f.

Figure 18:
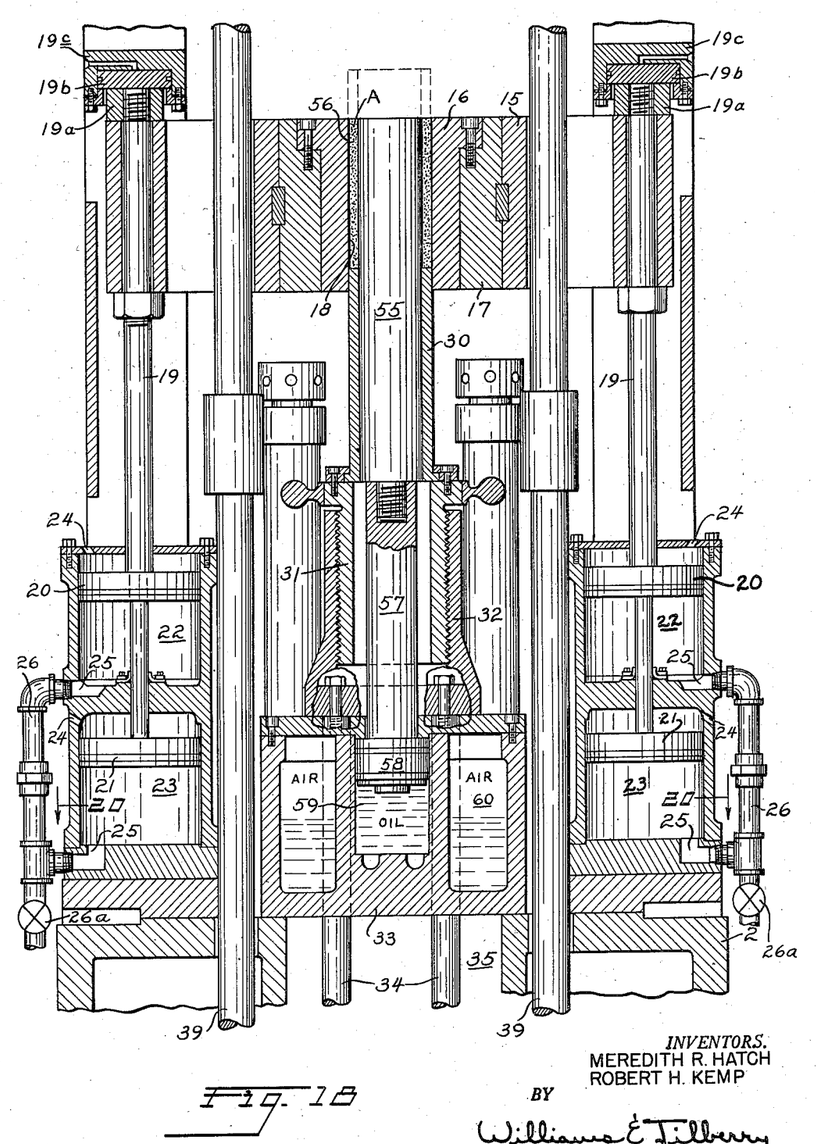
Figure 18 is an enlargement of a portion of Figure 3.
Figure 20:
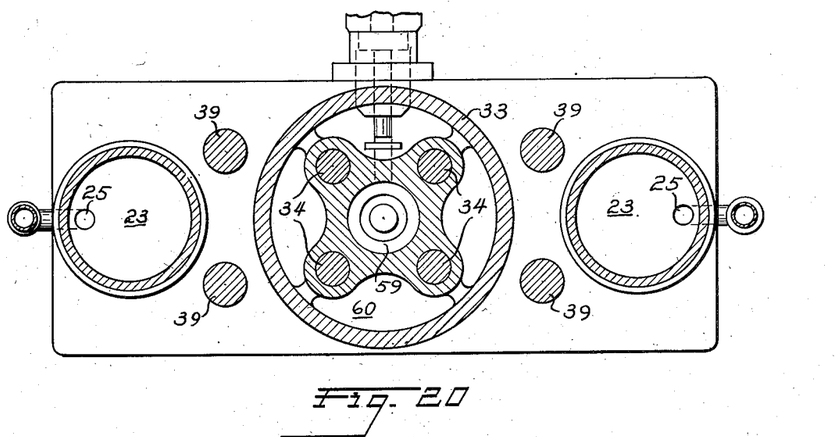
Figure 20 is a cross-sectional view taken on the line 20—20 of Figure 18.

The die 30 at its lower end is fixed to and projects upwardly from the upper end of a tubular support 31 that is threaded for vertical adjustment in a mounting cylinder 32. This cylinder rests freely at its lower end on the top of a casing 33 fixedly mounted on the frame base 2, as best shown in Figure 18. The bottom of the mounting cylinder 32 has a set of four rods 34 (Figures 18 and 20) fixedly projecting downwardly therefrom through the casing 33 and a registering opening 35 in the base 2, and attached at their lower ends to a piston 36 (Figure 3) working in a cylinder 37 of a casing 38. This casing is supported in the pit 6 by a pair of rods 39 that fixedly depend from and move with the die slide 12. These rods pass freely through the table 15 and registering portions of the base 2 into said pit 6.

The casing 38 forms an open bottom cylinder 40 below the cylinder 37 in which operates a piston 41 connected to the piston 36 by a rod 42. The cylinder 40 is slightly larger in internal diameter than the cylinder 37 and opens at its top into a space 43 between the walls of the cylinder 40 and casing 38. This space is closed at its bottom and forms an annular chamber 43 for a non-compressible fluid such, for instance, as oil 44, so that a down stroke of the casing 38 from raised position will cause the piston 41 to force air from the top of the cylinder 40 into the space 43 on top of the oil 44 therein.

Figure 13:
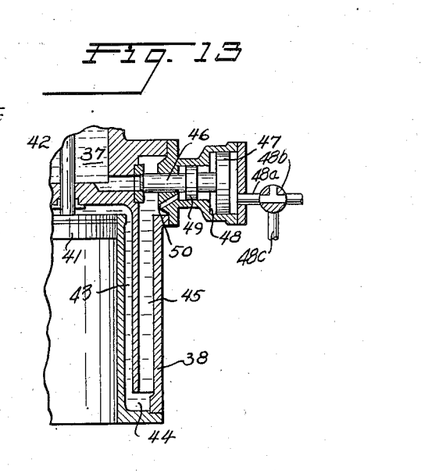
Figure 13 is a fragmentary sectional view taken on the line 13—13 of Figure 11.

In one side of the casing 38 there is provided a tubular passage 45 (Figure 5) which provides communication between the lower portion of the space 43 and the bottom of the cylinder 37 below the piston 36. This passage is controlled by a valve 46, and the valve itself is fluid pressure controlled. For this latter purpose, valve 46 has a plunger 47 working in a cylinder 48 to which, at the outer side of the plunger, fluid pressure is admitted through pipe 48a and three-way solenoid control valve 48b from any suitable source during a predetermined portion of a cycle. Control valve 48b is operated at the proper times in the operating cycle by suitable means (not shown) which are responsive to the position of the slide 12. When the valve 46 is to be opened, as illustrated in Figure 5, solenoid valve 48b is set to allow the pressure therein to bleed off through pipe 48c for return to the pressure source (not shown). To maintain the valve 46 in the closed position as shown in Figure 13, the solenoid valve 48b is turned 90° clockwise from its setting shown in Figure 5 whereby the fluid pressure is admitted through pipe 48a directly into cylinder 48 to act upon plunger 47 which holds valve 46 in the aforesaid closed position. The valve 46 carries at the inner side of the plunger 47 a similar plunger 49 working in a small diameter portion of the cylinder 48, and a port 50 opens communication between the inner end of said cylinder and the passage 45 at the side thereof in communication with the space 43. It is thus apparent that, when valve 46 is closed, an up stroke of the casing 38 tends to create a vacuum in the chamber or space 43 and at the ported end of the small diameter portion of cylinder 48 of the valve 46 to assist pressure at the outer side of the plunger 47 in holding the valve closed. It will also be seen that upon a down stroke of the casing 38 the air pressure created on top of the oil 44 in the space 43 will cause the oil to rise in passage 45 and pass through the port 50 and create a pressure on the plunger 49 to open valve 46, pressure having been released from the plunger 47 by the valve 48b, whereupon oil will flow through the passage 45 and into the lower end of the cylinder 37. Figure 5 illustrates the oil 44 exerting pressure on plunger 49 and flowing through passage 45 to cylinder 37 as occurs during downward movement of casing 38.

Figure 21:
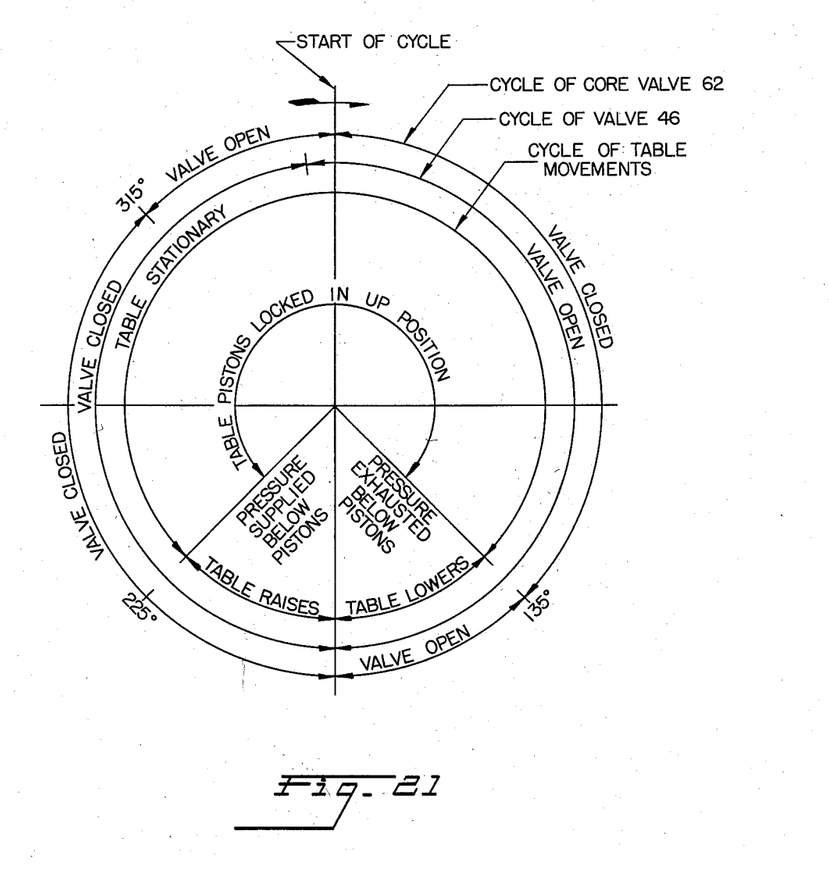
Figure 21 is a timing diagram of certain of the control valves and component elements.

At the start of a cycle the parts are in the relative positions shown in Figures 3 and 18 with the casing 38 raised so that the pistons 36 and 41 are in their lowermost positions relative to the respective cylinders 37 and 40 and with the valve 46 open (see Figure 21). As the main die slide 12 moves downwardly, the casing 38 lowers therewith and, the valve 46 being open, oil is forced from the space 43 up into the bottom of the cylinder 37.

Figure 11:
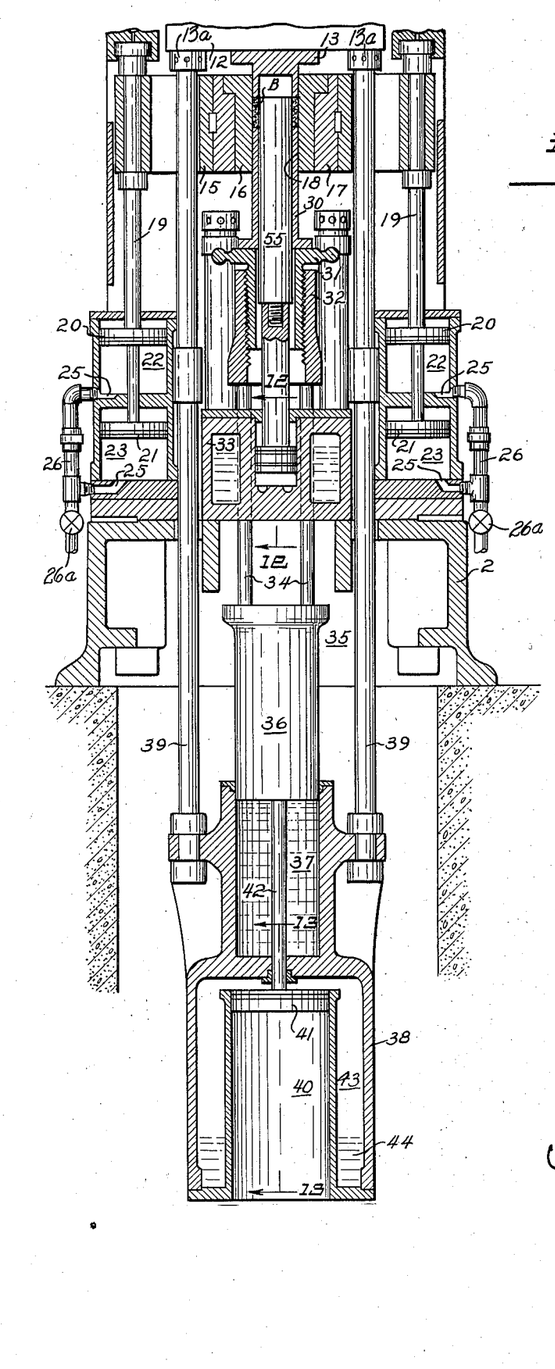
Figure 11 is a view generally similar to Figure 8 but with the main slide slightly up from its bottom position and with the mold table at the limit of its up stroke.
Figure 19:
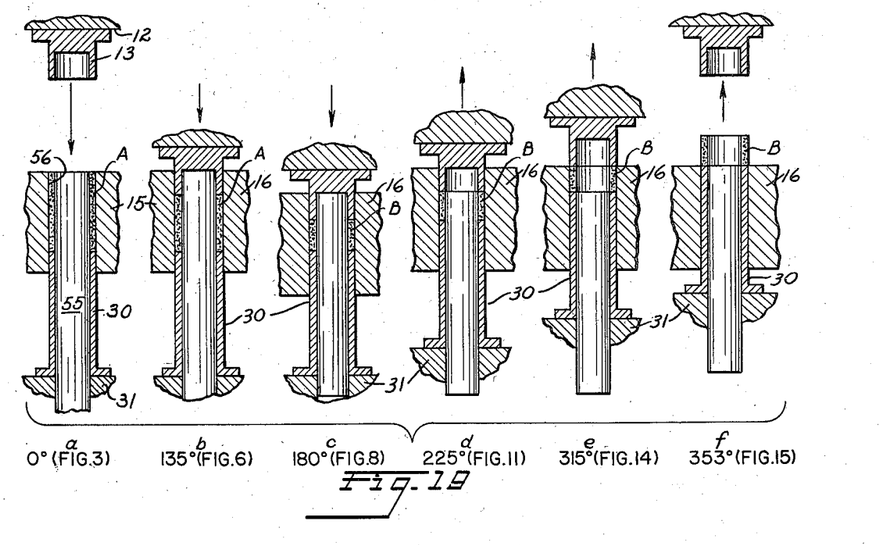
Figure 19 is a diagrammatic view showing the relative positions of the opposed pressing dies, the core and the mold table at successive points in a cycle of operations.

When the slide 12 has fully completed its down stroke, the parts are in the positions shown in Figure 8 and at *c* in Figure 19. As the slide 12 commences its up stroke solenoid valve 48b is opened to supply fluid pressure against plunger 47 and the valve 46 is thereby closed, thus blocking the flow of oil between cylinder 37 and the space 43 and hydraulically locking the casing 38 and pistons 36 and 41 together against further relative movement. Pistons 36 and 41 then move upward with the casing 38 and act through the rods 34 to raise the lower die 30 and its supporting members 31 and 32 into the position seen in Figure 11. During this period of upward movement, fluid pressure is admitted to the lower ends of the cylinders 22 and 23 and the table 15 is raised to its upper stopped position, as seen in Figure 11. From this point in the up stroke of the slide 12 (about 225° of the cycle as seen in Figure 21) the valve 46 continues closed so that the lower die 30 continues its up stroke relative to the table and molding die 16 until it moves the compressed work B to the completely ejected position shown in Figure 15 and at *f* in Figure 19. At this point, which is slightly before the end of the cycle, the valve 46 is opened by actuation of valve 48b to release the pressure on plunger 47, permitting the casing 38 to move upward relative to the pistons 36 and 41 for the remainder of the up stroke of the slide 12 and also permitting the lower die 30 and its carrying parts to move down to the normal starting positions shown in Figures 3 and 18 and at *a* in Figure 19.

*Mold core and its operation*

Figure 12:
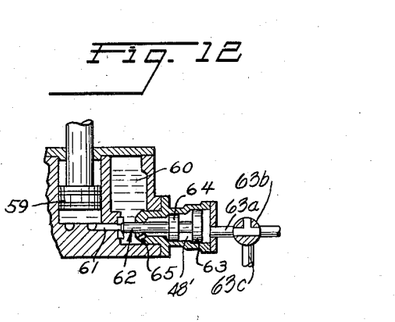
Figure 12 is a fragmentary sectional view taken on the line 12—12 of Figure 11.
Figures 15, 16, 17:
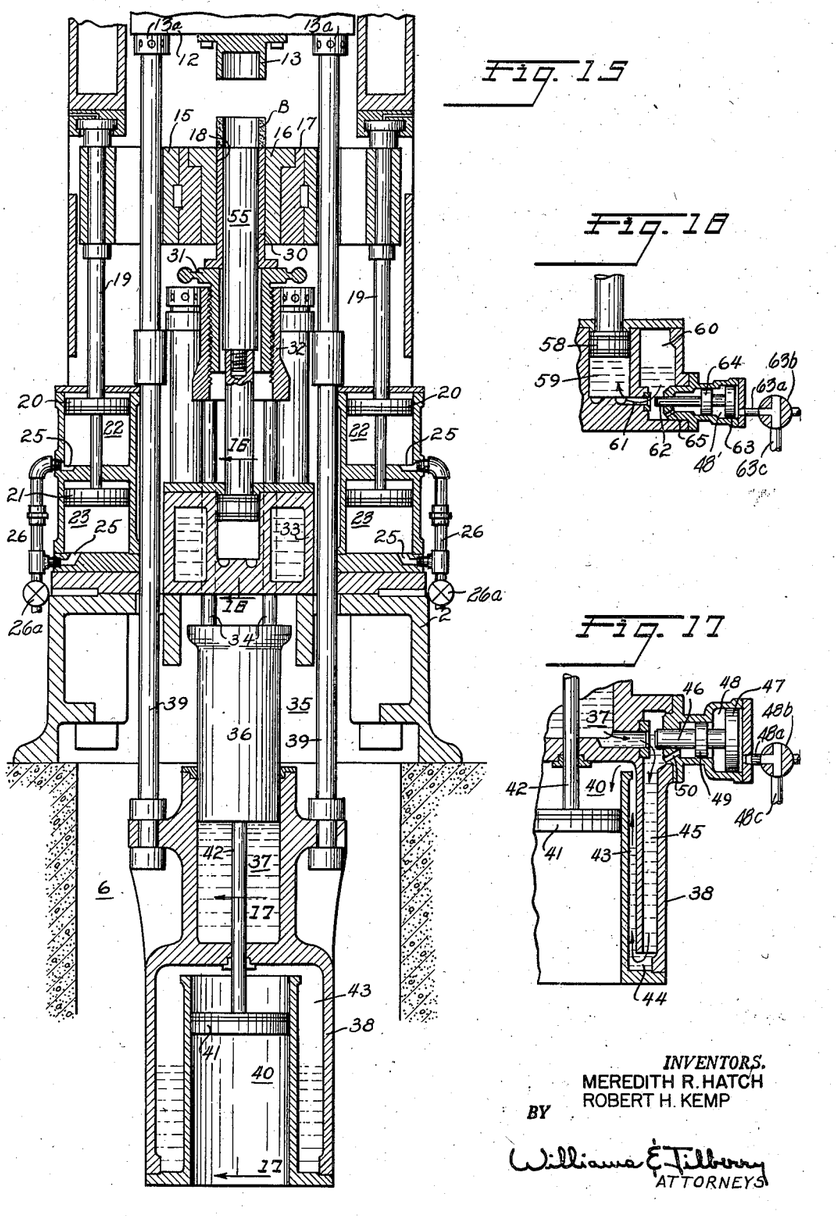
Figure 15 is a view generally similar to Figure 14 but with the main slide and upper die moved upwardly almost to the top of their stroke and the lower die and mold core at the limit of their up strokes with the workpiece fully ejected.
Figure 16 is a fragmentary sectional view taken on the line 16—16 of Figure 15.
Figure 17 is a fragmentary sectional view taken on the line 17—17 of Figure 15.

A core 55 (Figure 18) is axially movable in the molding die 16 and is spaced from its wall 18 to provide a molding space 56 therebetween in which the dies 13 and 30 slidingly fit. This core is of a length to extend from the top of the mold 16 to a distance down into the tubular die 30 when the parts are in the cycle starting position shown in Figures 3 and 18 and at *a* in Figure 19. The lower end of the core is attached to a stem 57 which extends down through the opening in the member 31, which adjustably supports the die 30, and attaches to a piston 58 operating in a vertical cylinder 59 in the casing 33 (Figure 18). Surrounding the cylinder 59 within the casing 33 is a chamber 60 in communication at its bottom with the cylinder 59 through a passage 61 (Figure 4). A valve 62 of the same fluid pressure controlled type as the valve 46 controls this passage. The cylinder 59 is filled and the chamber 60 is partially filled with oil, or other suitable non-compressible liquid, and the space in the chamber 60 above the oil forms an air cushion. Fluid pressure from a suitable source may be directed by pipe 63a against the outer side of the larger plunger 63 on the valve stem to close valve 62. A valve 63b in pipe 63a, operated by a solenoid or other suitable means, is arranged to be actuated in response to the position of slide 12 as by tripping arms (not shown). Oil pressure against the inner side of the small plunger 64 from the chamber 60, through the port 65, will open the valve 62 when the closing pressure is shut off by valve 63b. The operation of valve 62 is similar to the operation of valve 46 described above. When the valve 62 is to be opened, as illustrated in Figures 9 and 16, solenoid valve 63b is set to allow the pressure therein to bleed off through pipe 63c for return to the pressure source (not shown). To maintain the valve 62 in the closed position as shown in Figures 4 and 12, the solenoid valve 63b is turned 90° clockwise from its setting shown in Figures 9 and 16 whereby the fluid pressure is admitted through pipe 63a directly into cylinder 48' to act upon plunger 63 which holds valve 46 in the aforesaid closed position.

At the start of a cycle, as indicated in Figure 21, the valve 63b is open and pressure against plunger 63 holds valve 62 closed and it remains closed until the table 15 begins its downward movement with the main slide 12, at which time valve 63b is moved by its solenoid or the like to release plunger 63. This takes place near the end of the down stroke of slide 12 (at about 135° in the cycle) and valve 62 thereupon opens to permit downward movement of the core 55 with the table 15 to the limit of its down stroke, as shown in Figures 8 and 9 and as indicated at *c* in Figure 19. The downward movement of the plunger 58 forces the oil from the cylinder 59 to the chamber 60 and compresses the air in the top of the chamber. When the slide 12 and table 15 reach the limits of their down strokes, the valve 63b is moved by its actuating means to connect the fluid pressure source to the cylinder which houses plunger 63 and the valve 62 closes and remains closed through the *c*, *d* and *e* stages in Figure 19. Between the stages *e* and *f* in Figure 19, at about 315° in the cycle as seen in Figure 21, the valve 63b is actuated to release the pressure on plunger 63 and valve 62 opens, thus permitting the plunger 58 and core 55, under the compressed air and oil in the chamber 60, to be moved to their uppermost positions at which time the workpiece is entirely ejected from the table die 16, as shown in Figure 15 and at *f* in Figure 19.

*General operation*

Figures 6, 7:
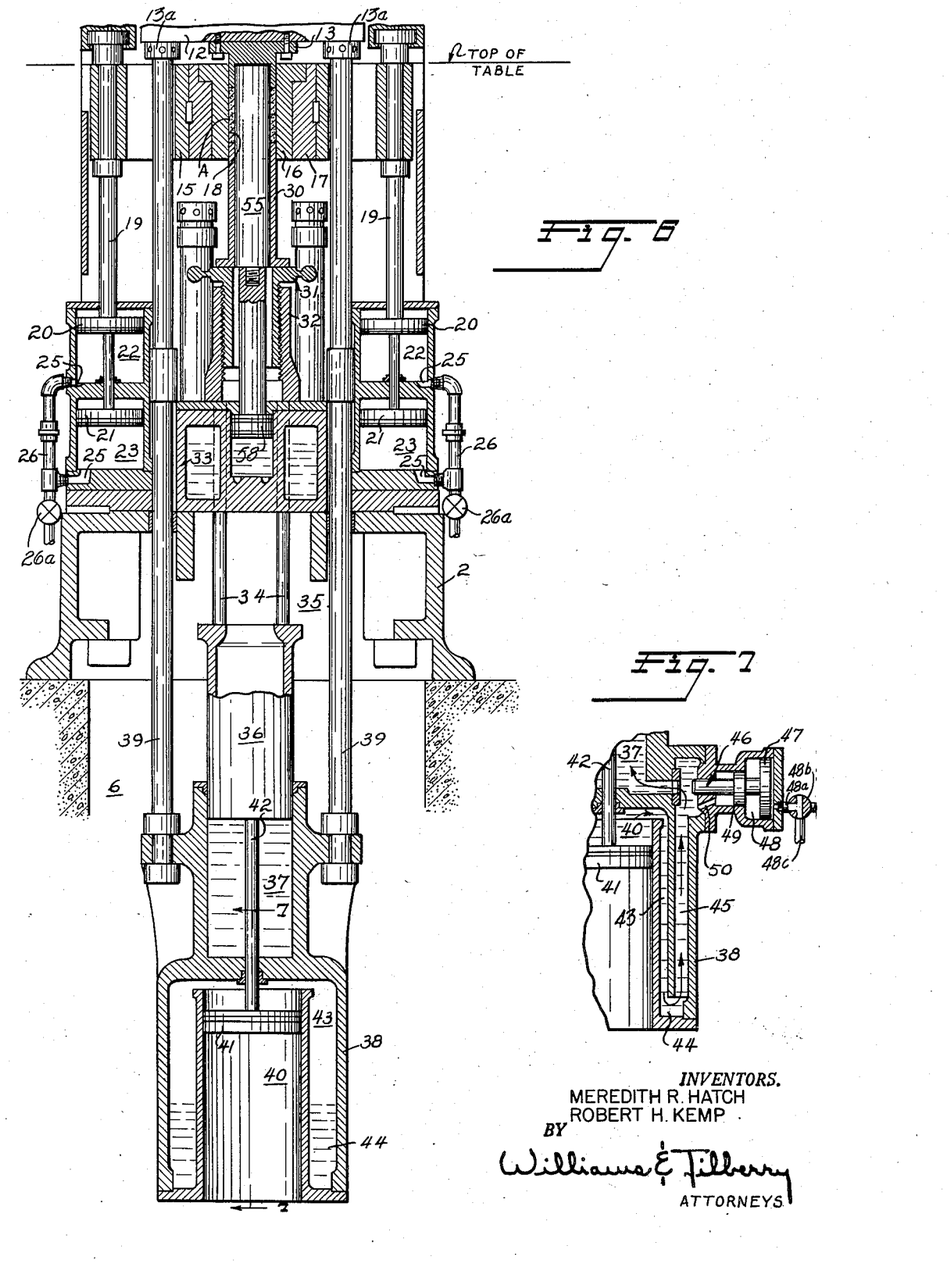
Figure 6 is a sectional view similar to Figure 3 but with the parts in the initial pressing position.
Figure 7 is a sectional view taken on the line 7—7 of Figure 6.

When the press is at rest after the completion of a cycle, a charge of loose powdered material A is placed in the charge-receiving mold cavity 56 (Figures 3, 18 and 19a). At the beginning of a cycle, the slide 12 first moves down under its mechanical power during which movement the die 13 enters the mold cavity 56 and compresses the charge therein around the core 55 and against the then stationary upper end of the lower die 30 until the slide has made contact with the table 15 and the upper die adjusting blocks 13a seat on the top surface of the core 55. This is seen in Figures 6 and 19b and takes place at approximately 135° in the down stroke of the slide. At this point the valve 26a controlling the release of pressure from the cylinders 22 and 23 is opened by a solenoid or other means which is activated when slide 12 reaches the 135° position. This permits the table 15 and its molding die 16 to move down with the slide 12 for the remainder of its down stroke.

During the down stroke of the slide 12, the valve 62 controlling the core 55 remains closed until the time of engagement of the slide with the table 15 (at about 135° in the cycle) when it is then opened as previously described to permit lowering of the core with the table. During such table and core lowering, the oil is forced from the cylinder 59 (Figure 18) into the chamber 60 as aforesaid, compressing the air in the top of the latter. During the down stroke of the slide 12, the control valve 46 opens as previously described and the cylinder casing 38 lowers therewith relative to the plungers 36 and 41 attached to the lower die 30, which latter stands motionless on the support 31 during this movement. The initial press of the powdered material charge A takes place downwardly from the top during the period that the upper die 13 moves into the molding die 16 and before the table starts its downward movement (see *b* of Figure 19). The final press is effected upwardly from the bottom, as indicated at *c* in Figure 19, by lower die 30 as the table 15 moves down during the latter part of the down stroke of slide 12.

At the beginning of the up stroke of the slide 12, the parts are in the relative positions shown in Figure 8 with the valves 46 and 62 both closed (see also Figure 21) and the control valves 26a of the table cylinders 22 and 23 opened to admit a fluid raising pressure therein. As the slide 12 moves upwardly, the table 15 moves upwardly therewith to its upper stopped position under pressure in said cylinders 22 and 23. As the valve 46 is closed, the lower die 30 also moves upwardly, the plungers 36 and 41 being fluid-locked to and moving with the casing 38. The die 30 continues its upward movement with the slide 12 and upper die 13 sufficiently to eject the press workpiece from the table die after the upward table movement is stopped (see Figures 15 and 19f).

During the pressing operation, both the wall 18 of the molding die 16 and the core 55 have sliding coaction with the respective surfaces of the workpiece B, thus producing a burnishing or smoothing action on both its inner and outer surfaces. Great pressure must be applied to the dies 13 and 30 in order to form a workpiece B therebetween having a suitable fine grained homogeneous cross section, and the more compactly the workpiece B is pressed the greater will be the work required to strip the piece from the mold. Accordingly, the stripping of the piece is done in two stages to reduce the effort required for the operation. The first stage is to strip the inner surface of the workpiece B from the outer surface of the core 55. Referring to Figures 19c and 19d, it will be seen that table 15 and die 30 move upwardly together while at the same time core 55 remains stationary, whereby die 30 forces the workpiece B upwardly about the core 55. Thereafter, table 15 comes to rest at its uppermost position but die 30, which is hydraulically locked to the upward movement of die 13, continues upwardly with die 13 to strip the workpiece B from the inner walls of the mold 16 of table 15 (see Figure 19e), thus completing the second stage of the stripping operation.

To explain further the operation of the press, an analysis of the relative movements of the various parts has been made in the chart of Figure 21 and may be better understood by examining this chart in conjunction with the other figures set forth and explained hereinabove and in particular Figure 19. From a study of Figure 21, it may be seen that the movement and timing of the various parts are arranged relative to a 360° cycle in which the slide 12 is moving downwardly, from an initial top position seen in Figures 3 and 19a, during the first half or 180° of the cycle, and is moving upwardly during the last half of the cycle. During the first 135° of the downward movement of the slide 12, the core valve 62 is held closed by pressure, controlled by suitable valve means 63b, on the outer end of plunger 63, thereby maintaining the core 55 in its upper position with its top surface level with the top of table 15. During the entire 180° of downward movement of slide 12 the valve 46 is open, pressure against the outer end of plunger 47 being cut off by suitable control valve means 48b, whereby liquid from the lower portion of chamber 38 is permitted to flow upwardly into the cylinder 37. As the slide 12 progresses downwardly the bottom of the die 13 will engage the top of the core 55 at about 135° from starting position (see Figures 6 and 19b). At this time the pressure which has been applied through ports 25 to lock the table pistons 20 and 21 in their upper positions is released by suitable valve means 26a in the pipes 26. Also at the same time the core valve 62 is permitted to open by releasing the pressure on plunger 63 which has held it closed. By releasing the upholding pressure from the table operating pistons 20 and 21 and opening core valve 62 at the 135° point in the cycle, the table 15 and the core 55 are permitted to lower uniformly with the continued downward motion of the slide 12 into the 180° or bottom positions seen in Figures 8 and 19c.

At the 180° or halfway point in the cycle pressure is once again applied beneath the table pistons 20 and 21, causing the table 15 to rise with the return or upward stroke of slide 12. At the same point in the cycle valve 62 is again closed by the application of pressure against the outer end of plunger 63. This results in hydraulically locking the core 55 to casing 33 on the stationary press base structure 2 and the core will remain stationary in its lowermost position as the slide 12, top die 13, table 15 and molding die 16 move upwardly into the positions of Figures 11 and 19d (about 225° in the cycle) at which point slide 12 and parts carried thereby are blocked against further upward movement by engagement of upper ends of rods 19 with the frame members 19b. Also at the 180° or halfway point in the cycle valve 46, which has been open up until this point, is closed by the application of pressure through valve 48b from a suitably controlled source (not shown) against the outer end of plunger 47, thereby locking pistons 41 and 36 and lower die 30 to the upward movement of slide 12. Thus, from the 180° point the lower die 30 will move upwardly with the slide 12. At about 315° in the cycle the top end of lower die 30 will be approximately even with the upper surface of the core 55 and the compressed bushing B will have been pushed upwardly relative to the stationary core 55 until its top edge is about even with the top surface of the table 15 (see Figures 14 and 19e). Also at about the 315° point in the cycle the valve 62 is reopened permitting the core 55 to move upwardly under the influence of the pressure accumulated in chamber 60 (Figure 16). Upward movement of core 55 is stopped by engagement of the top of piston 58 with the end of cylinder 59 (see Figure 16) but slide 12 and top die 13 continue upwardly as indicated in Figures 15 and 19f until the full 360° cycle is completed.

The press is designed so that the top edge of the die 30 reaches the level of the table 15 a few degrees prior to the end of the cycle, at which time the workpiece B has been fully ejected from the mold. As seen from Figure 21, valve 46 also reopens slightly before the 360° point permitting lower die 30 to drop by gravity to its starting position (Figure 3) substantially below the level of table 15 by the time the 360° point is reached. At this point rotation of crank 11 is stopped so that bushing B may be removed and the mold chamber recharged with powder for another molding or briquetting operation.

It is to be understood that while only one embodiment of the invention is shown herein, this embodiment is by way of example only and is not to be construed in a limiting sense. Other arrangements and modifications will occur to those skilled in the art and may be resorted to without departing from the scope of the invention.

We claim:

1. Apparatus for pressing powdered material comprising a hollow mold open at both ends, a pair of opposed dies on opposite sides of and in axial alignment with said mold, means for holding one of said dies in stationary engagement within one of said mold open ends during a first portion of the apparatus operating cycle, means for bringing the other of said dies into said mold through the other of said open ends for pressing contact with powdered material therein, means to move said other die and said mold in unison toward said first mentioned die thereby further pressing said powdered material, means for retracting said other die from said mold and for moving said first mentioned die relative to said mold to eject the finally compressed powdered material.

2. Apparatus for pressing powdered material comprising a hollow mold open at both ends, a core within said mold, a pair of opposed dies adapted telescopically to slide between said mold and said core at opposite mold ends, means for holding one of said dies in stationary telescopic contact therein during a first portion of the apparatus operating cycle, means for sliding the other of said dies inwardly for pressing contact with powdered material between said mold and said core during said first portion of said cycle, means to move said other die, said mold and said core in unison toward said first mentioned die to further press said powdered material therebetween, means to move said first mentioned die, said other die, and said mold in unison with respect to said core to partially strip the resulting pressed product from said core, means for retracting said other die from said mold and for pushing said first mentioned die through said mold to eject the finally compressed product, and means to return said core to its initial position in said mold.

3. Apparatus for pressing powdered material into an article of manufacture comprising a hollow mold open at both ends, a core axially aligned within said mold and extending therethrough, a pair of opposed dies adapted to telescopically slide between said mold and said core at opposite mold ends, one of said dies being in stationary telescopic contact therein during a first portion of the apparatus operating cycle, means for sliding the other of said dies inwardly for pressing contact with powdered material between said mold and said core during said first portion of said cycle, means to move said other die, said mold and said core in unison toward said first mentioned die to further press said powdered material therebetween, and means to strip the pressed article from between the said mold and the said core including means to move said mold and said dies upwardly as an integral unit to partially strip the said article from the said core, and means to arrest the upward movement of said mold while continuing the upward movement of said dies whereupon said article is fully stripped from said core and ejected from said mold apparatus.

4. In a powdered metal compacting press including a base, side members secured to said base, a slide carried between said side members, and means for imparting reciprocal movement to said slide, the improvement comprising an upper die secured to said slide, a table between said side members and beneath said slide, an open end mold vertically aligned and housed within said table, a lower die resting on said base and adapted to move upwardly through the bottom open end of said mold, a core fitted for sliding contact within said lower die, said core being in axial alignment with said mold and extending upwardly therethrough, fluid pressure table support means secured to said base, fluid pressure core support means secured to said base, said means respectively being adapted to permit said table and said core to move vertically downward responsive to downward pressure contact of said upper die and to return said table and said core upwardly when said upper die releases downward pressure thereupon, and fluid means to interlock said upper and lower dies during the return stroke of said upper die, whereby said lower die is drawn upwardly through said mold to assist in ejecting the article compressed therein.

5. The press set forth in claim 4, wherein said fluid pressure core support means comprises a piston integrally secured to said core, a piston cylinder in said base to receive said piston for sliding engagement therein, a closed cylinder in communication with said piston cylinder by means of a valve controlled port, whereby with said piston cylinder liquid filled and said closed cylinder gas filled, downward movement of said piston, when said upper die forces said core downwardly, will force liquid from said piston cylinder into said closed cylinder to compress said gas, and valve means to open said port when said upper die pressure is removed from said core, whereby said compressed gas will force said liquid back into said piston cylinder to return said core to its initial position.

6. The press set forth in claim 4, wherein said fluid pressure core support means comprises a piston integrally secured to said core and depending therefrom, a piston cylinder in said base including spaced apart concentric inner and outer walls sealed together at their outer peripheral edges to form inner and outer chambers, and valve controlled communication means therebetween, said inner chamber being adapted to receive said piston for sliding engagement therein whereby with said inner chamber liquid filled and said outer chamber gas and liquid filled downward movement of said piston will force liquid from said inner chamber into said outer chamber to compress said gas, said valve controlled communication means being adapted to open communication between said chambers at a predetermined point in the operating cycle to permit said compressed gas to return liquid into said inner chamber thereby elevating said core to its initial position.

7. The press set forth in claim 4 wherein said means to interlock upward movement of said lower die with that of said upper die comprises a first lower die cylinder, structural means rigidly securing said first lower die cylinder to said slide, a lower die piston rigidly depending from said lower die and adapted to slide within said first lower die cylinder, a second lower die cylinder, means to force liquid from said second cylinder into the space in said first lower die cylinder vacated by said lower die piston as said structural means lowers said first cylinder away from said first piston during the down stroke of said slide, and valve means to hold said liquid in said first cylinder whereby said lower die is fluid locked for synchronized movement with said upper die during the upward stroke of the cycle.

8. The press set forth in claim 4, wherein said means to interlock upward movement of said lower die with that of said upper die comprises a cylinder casing disposed beneath the base of said press, tie rod means connecting said casing to said slide for synchronized reciprocal movement therewith, a first piston suspended beneath said lower die and rigidly secured thereto, a first cylinder in said casing adapted to receive said first piston for sliding contact therein, a second cylinder in said casing opposed to said first cylinder, the bases of said cylinders being in abutting contact to form a common wall therebetween, a piston rod secured at its upper end to said first piston and extending downwardly through said cylinder bases into said second cylinder, a second piston secured to said piston rod for sliding contact with said second cylinder and valve controlled port means for communication between said first and second cylinders, whereby downward movement of said slide forces said second cylinder toward said second piston and said first cylinder downwardly away from said first piston thereby forcing fluid from said second cylinder upwardly into said first cylinder to lock said first cylinder apart from said first piston so that upward movement of said slide will draw said first piston and said lower die upwardly therewith.

9. The press set forth in claim 4 wherein means adapted to interlock upward movement of said lower die with that of said upper die comprises tie rods secured at their upper ends to said slide and slidably passing through said table and said base, a cylinder secured to the lower ends of said tie rods for suspension therefrom, a piston adapted for sliding engagement within said cylinder, a piston rod secured at its upper end to said lower die and slidably passing through said base rigidly to engage said piston, means for maintaining the expanding chamber between said piston and said cylinder fluid filled as said cylinder is urged downwardly away from said piston by said tie rods, and means for maintaining said chamber fluid filled when expanded fully as said tie rods draw said cylinder and said piston upwardly.

10. The press set forth in claim 4, wherein said means adapted to interlock upward movement of said lower die with that of said upper die comprises a cylinder casing disposed beneath the base of said press, tie rods secured at their upper ends to said slide, slidably passing through said table and said base and secured at their lower ends to said casing, said casing forming a pair of upper and lower opposed cylinders, the bases of said cylinders being in abutting contact to form a common wall therebetween, said lower cylinder having spaced apart concentric inner and outer walls sealed together at their lower peripheral edges to form inner and outer chambers, the upper end of said inner chamber being in communication with said outer chamber, and said outer chamber being in valve controlled communication with said upper cylinder, an upper cylinder piston in sliding contact with said upper cylinder, piston rods slidably passing through said press base rigidly to secure said lower die to said upper piston, a piston in said inner chamber, and a piston rod passing through said abutting cylinder bases rigidly to connect said inner chamber piston with said upper cylinder piston, whereby downward movement of said slide urges said lower cylinder toward said inner chamber piston and said upper cylinder away from said upper cylinder piston to force fluid from said lower cylinder into said upper cylinder thereby holding said upper cylinder piston apart from said cylinder base so that upward movement of said slide connected tie rods will draw said pistons and said lower die upwardly with said cylinder casing.

11. The press set forth in claim 4, wherein said fluid pressure table support means comprises a pair of superposed fluid cylinders on opposite sides of said base, a piston in each cylinder, a piston rod connected at one end to each pair of superposed pistons and at the other end to said table, the upper ends of said piston rods extending upwardly through said table to form bumpers for engagement with cushion means integral with said side members, and valve means for controlling the flow of fluid beneath said pistons to regulate the elevation of said table, said means being adapted to return said table and said core upwardly when said upper die releases downward pressure thereon.

12. The press set forth in claim 4, wherein said fluid pressure means are controlled by a system of valves comprising initially closed core and table valves, and an initially open lower die valve, whereby said core and table valves open to allow said core and said table to lower with said upper die and close after said core and table have been returned to initial elevations, and said lower die valve closing after said dies are fluid pressure interlocked and remaining closed until the said article is ejected from said mold.

References Cited in the file of this patent

UNITED STATES PATENTS

| | | |
|---|---|---|
| 2,398,227 | Hubbert | Apr. 9, 1946 |
| 2,499,980 | Stokes et al. | Mar. 7, 1950 |
| 2,509,783 | Richardson | May 30, 1950 |
| 2,570,989 | Seelig | Oct. 9, 1951 |
| 2,640,325 | Haller | June 2, 1953 |